United States Patent [19]

Nelson et al.

[11] Patent Number: 5,090,824
[45] Date of Patent: Feb. 25, 1992

[54] FAST OPTICAL SWITCH HAVING REDUCED LIGHT LOSS

[75] Inventors: Bruce N. Nelson, South Boston; Ronald F. Cooper, Littleton, both of Mass.

[73] Assignee: Geo-Centers, Inc., Newton Centre, Mass.

[21] Appl. No.: 560,128

[22] Filed: Jul. 31, 1990

[51] Int. Cl.⁵ .............................................. G02B 6/10
[52] U.S. Cl. .................................. 385/22; 385/16; 250/227.14
[58] Field of Search ............... 350/96.14, 152, 157, 350/389; 250/227.14, 225

[56] References Cited

U.S. PATENT DOCUMENTS

| Re. 28,971 | 9/1976 | Kumada et al. | 350/150 |
|---|---|---|---|
| 2,768,557 | 10/1956 | Bond | 88/61 |
| 3,481,661 | 12/1969 | Harris | 350/152 |
| 3,536,375 | 10/1970 | Mansell | 350/157 |
| 4,269,483 | 5/1981 | Feldtkeller | 350/390 |
| 4,343,536 | 8/1982 | Watanabee et al. | 350/355 |
| 4,403,352 | 10/1983 | Huignard et al. | 455/601 |
| 4,465,969 | 8/1984 | Tada et al. | 324/96 |
| 4,554,449 | 11/1985 | Taniuchi et al. | 250/227.14 |
| 4,563,093 | 1/1986 | Tada et al. | 356/368 |
| 4,595,876 | 6/1986 | Kuhara et al. | 324/96 |
| 4,631,402 | 12/1986 | Nagatsuma et al. | 250/231 |
| 4,698,497 | 10/1987 | Miller et al. | 250/231 |
| 4,734,576 | 3/1988 | Agoston et al. | 250/225 X |
| 4,919,522 | 4/1990 | Nelson | 350/389 |

FOREIGN PATENT DOCUMENTS 74854 10/1966 Canada .................................. 88/117

OTHER PUBLICATIONS

"Final Technical Report, Fast Optical Switch for Mulimode Fiber Optic Based Control Systems, Phase I", Prepared by Geo-Centers, Inc., under Contract No. NAS-25615, Aug., 1989.

"Non-Invasive Electro-Magnetic Field Sensor", Nelson et al., AFWAL-TR-86-3051, Final Report, AF Wright Aeronautical Laboratories, Jan., 1986.

"A Fibre Optic Electric Field Sensor Using the Electrooptic Effect $Bi_4GE_3O_1$", K. Shibata, Published by IEE, Given at the First International Conference on Optical Fibre Sensors, Apr. 26, 1983.

Primary Examiner—Frank Gonzalez
Assistant Examiner—Phan T. Heartney
Attorney, Agent, or Firm—Wolf, Greenfield & Sacks

[57] ABSTRACT

An electrically controlled optical switch uses an electro-optic crystal of the type having at least one set of fast and slow optical axes. The crystal exhibits electric field induced birefringence such that a plane of polarization oriented along a first direction of a light beam passing through the crystal may be switched to a plane of polarization oriented along a second direction. A beam splitting polarizer means is disposed at one end of the crystal and directs a light beam passing through the crystal whose plane of polarization is oriented along the first direction differently from a light beam having a plane of polarization oriented along the second direction. The electro-optic crystal may be chosen from the crystal classes $\overline{4}3m$, $\overline{4}2m$, and 23. In a preferred embodiment, the electro-optic crystal is a bismuth germanium oxide crystal or a bismuth silicon oxide crystal. In another embodiment of the invention, polarization control optics are provided which transmit substantially all of the incident light to the electro-optic crystal, substantially reducing the insertion loss of the switch.

31 Claims, 5 Drawing Sheets

FAST OPTICAL SWITCH HAVING REDUCED LIGHT LOSS

U.S. GOVERNMENT RIGHTS IN THE INVENTION

A portion of this invention was made by an employee of Geo-Centers, Inc. in the performance of work under NASA Contract No. NASA3-25615 with Geo-Centers. The United States of America has certain rights in the invention arising out of that contract, as provided under Federal Acquisition Regulation 52.227-20.

BACKGROUND OF THE INVENTION

1. Field of the Invention

The present invention relates generally to the field of transmission and control of optical signals. More particularly, the invention pertains to an electrically controlled apparatus for high speed switching of optical signals. The switching apparatus is especially suitable for applications where the optical signals are transmitted by multimode optical fibers.

2. Discussion of the Prior Art

Until recently, fast optical switching for multimode fiber optic communication and sensor networks was not available. Prior art opto-mechanical switches are known in which the free end of a optical fiber is movable from one contact to another. At each contact, the movable end is aligned with the fixed end of another optical fiber. Such opto-mechanical switches operate at slow speeds (on the order of a few milliseconds) which severely limits their utility. Moreover, repeated flexing of the movable free end of the optical fiber tends to induce fatigue and ultimately results in breakage of the fiber.

By contrast, a fully optical switch is not subject to fatigue and breakage and can operate at much faster speeds.

Systems which use optical switches are able to operate reliably in environments where electronically switched systems have proved to be unreliable because the optical signals transmitted along the optical fibers are not perturbed by electromagnetic interference. Moreover, optical switches are more directly compatible with optical fiber networks than electronic switches because optical fibers can be directly connected to optical switches without requiring converters to change the optical signals to electrical signals.

One example of a recently developed, fully optical switch may be seen in U.S. Pat. No. 4,919,522 to Nelson, granted Apr. 24, 1990, and assigned to the same assignee as the present invention, the specification of which is incorporated herein by reference. That electrically controlled optical switch uses an electro-optic crystal of the kind having two independent sets of fast and slow optical axes in the crystal. One set of fast and slow axes is sensitive to a first electric field extending through the crystal in one direction along a crystal direction and the other set of fast and slow axes is angularly disposed with respect to the first set and is sensitive to a second electric field extending through the crystal in a direction orthogonal to the first electric field.

That optical switch also uses a rectangular parallelepiped crystal with electrodes formed on the four opposing sides of the crystal. The activation of one opposed pair of electrodes causes light to pass through one set of optical axes, while activation of the other pair of opposed electrodes causes light to pass exclusively through the other set of optical axes in the crystal.

Although that prior art switch operates well as a fast optical switch, it requires a crystal having two sets of well-defined fast and slow optical axes in the crystal. Additionally, that switch has an inherent loss of one half of the input light intensity due to the polarizing optics required. This insertion loss reduce the overall light transmission through the switch which decreases the number of switches that may be cascaded in a system.

Therefore, an object of the present invention is to provide an electrically controlled optical switch that operates at a switching speed faster than one microsecond.

Another object of the present invention is to provide an electrically controlled optical switch which only requires a single optical path through a switching element.

A further object of the present invention is to provide an electrically controlled optical switch having lower input light loss than prior art switches.

SUMMARY OF THE INVENTION

The foregoing and other objects, features, and advantages of the present invention are achieved in an electrically controlled optical switch employing an electro-optic crystal of the kind having on set of well-defined fast and slow optical axes in the crystal. The set of fast and slow optical axes is sensitive to a electric field extending through the crystal in one direction. Polarized light is introduced into the crystal. When an electric field of sufficient magnitude and direction is applied to the crystal, the plane of polarization of the light within the crystal is switched from one polarization to another polarization within the crystal. A beam splitting polarizer is located at the output of the crystal to detect the change in the plane of polarization, thereby routing light in either of two directions.

The Nelson '522 switch requires a crystal having two sets of fast and slow optical axes or two crystals each having a set of fast and slow optical axes, two opposed pairs of electrodes on the crystal or an opposed pair of electrodes on each of two crystals, two separate optical paths through the crystal or crystals, and two separate sets of polarizers on the output side of the switch and two separate input polarizations to achieve a single pole, double throw optical switch. By contrast, the present invention achieves a single pole, double throw optical switch using a crystal having on set of fast and slow optical axes, one pair of electrodes, one optical path through the crystal, and one set of polarizing optics for beam switching. The present invention achieves the same result as the Nelson '522 switch, but uses different polarizing optics that operate in a manner different from the '522 optics resulting in a more compact, less complex switch construction.

In another embodiment of the invention, polarization control optics are interposed between the source of light and the electro-optic crystal to reduce the inherent light loss of the switch, thereby improving the switch's efficiency and reducing the insertion loss.

The foregoing and other objects, features, and advantages of the present invention will be more readily understood and apparent from the following detailed description of the invention, which should be read in conjunction with the accompanying drawings, and from

DETAILED DESCRIPTION

For purposes of illustration only and not to limit generality the present invention will now be explained with reference to its use in a fast optical switch wherein the electro-optic crystal is bismuth germanium oxide (BGO) or bismuth silicon oxide (BSO). However, one skilled in the art will appreciate that any crystal having no natural birefringence along a given light propogation direction and at least one set of well defined fast and slow optical axes may be used in the present invention.

Figure 1:
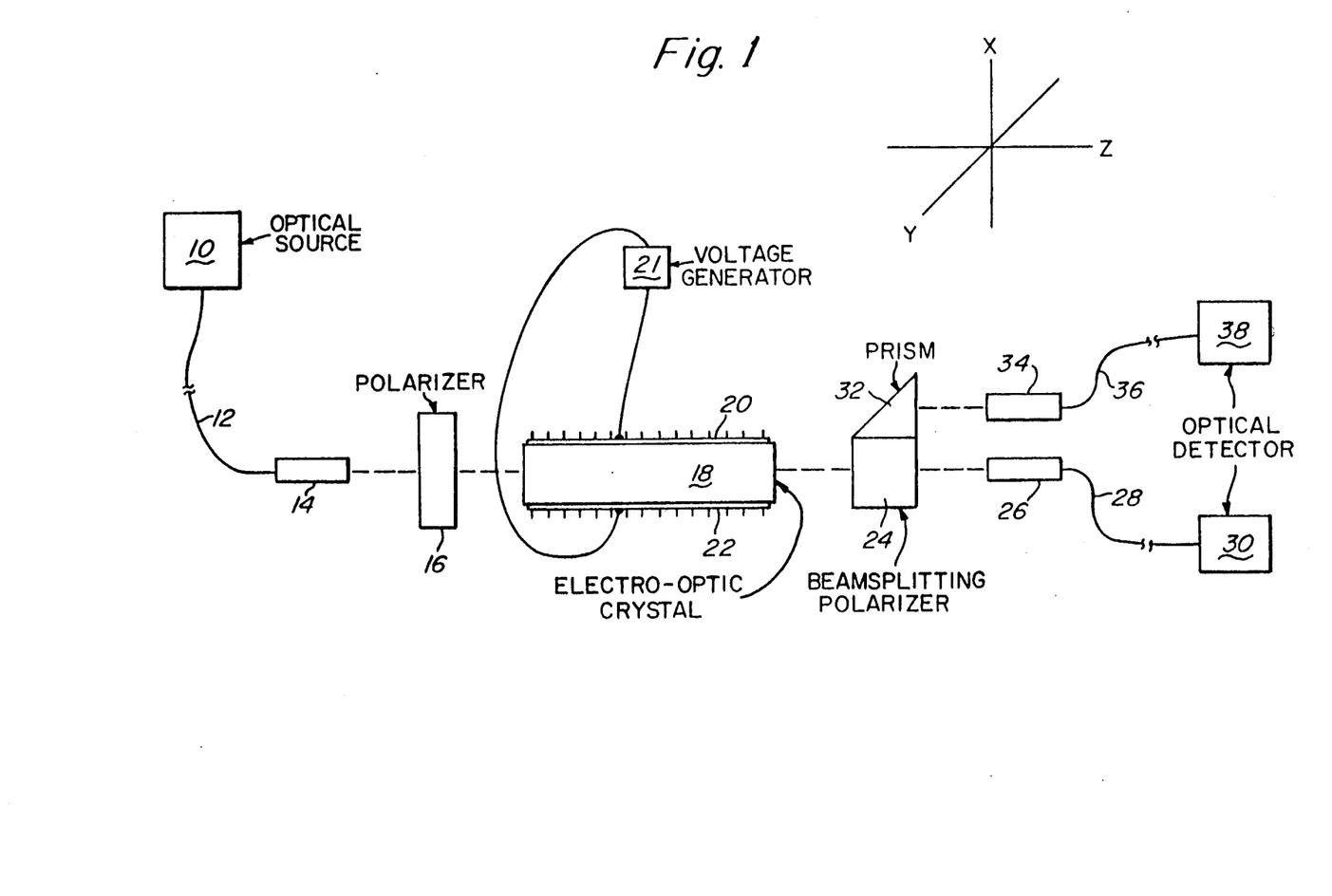
FIG. 1 schematically depicts an electro-optic switch of the present invention.

Reference is now made to FIG. 1, which figure illustrates the basic arrangement of the fully bidirectional, fast optical switch of the present invention. The switch in FIG. 1 has an activation time of less than one microsecond. The switch uses light provided by optical source 10 which light is preferably of a single wavelength or of a narrow spectrum, such as that from a light emitting diode (LED) or the like. Optical source 10 may be a laser of the type that emits light that is principally of one wavelength. However, the light emitted by optical source 10 can be incoherent, such as light produced by an LED.

The light from optical source 10 is transmitted along optical fiber 12 to collimating means 14. Collimating means 14 may be any type of collimating lens such as a grin-rod (graded index) lens available under the tradename SELFOC® or a refractive lens. Light emerging from collimating means 14 is a collimated light beam that is transmitted to polarizer 16. The light emerging from polarizer 16 is plane polarized light which is transmitted to electro-optic crystal 18. Electro-optic crystal 18 is a crystal having at least one well defined set of fast and slow optical axes in the crystal. The plane of polarization of the light emerging from polarizer 16 is arranged to coincide with one of the directions of crystal 18. A pair of electrodes 20 and 22 is used to impress a voltage differential generated by voltage generator 21 across the crystal between the electrodes. The crystal 18 is chosen from crystal classes $\bar{4}3m$, $\bar{4}2m$, or 23. In a preferred embodiment, crystal 18 is a BGO crystal such as bismuth orthosilicate or bismuth orthogermanate.

As will be explained in greater detail hereinafter, crystal 18 has one set of fast and slow optical axes. The fast and slow optical axes are respectively oriented, for electric fields along the <110> crystal direction, at $\pi/4$ (i.e. 45°) with respect to the <1$\bar{1}$0> crystal direction, which corresponds to the X axis in FIGS. 1–6. The electric field generated by electrodes 20 and 22 and parallel to the X axis is used to switch the plane of polarization of the light passing through crystal 18 between the X and Y axes.

The light beam emerging from crystal 18 is transmitted to light beam directing means 24, which may be, for example, a beam splitting polarizer. Light beam directing means 24 may be any optical device such as a Glan-Taylor prism which can direct light having orthogonal planes of polarization in different directions. If the polarization of the emerging light beam is vertical, that is oriented along the X axis, beam splitting polarizer 24 will pass the light beam straight through to collimating means 26 (which is the same type as collimating means 14) which interfaces the light beam 26 to optical fiber 28. The light passing through optical fiber 28 may then be detected by optical detector 30. On the other hand, if the light beam emerging from crystal 18 is horizontally polarized, that is, its plane of polarization is oriented along the Y axis, beam splitting polarizer 24 will direct the light beam along a direction parallel to the X axis so that it enters and reflects from prism 32. The light emerging from prism 32 is transmitted to collimating means 34 (which is the same as collimating means 14) and then to optical fiber 36. Light transmitted by optical fiber 36 may then be detected by optical detector 38.

Figure 2:
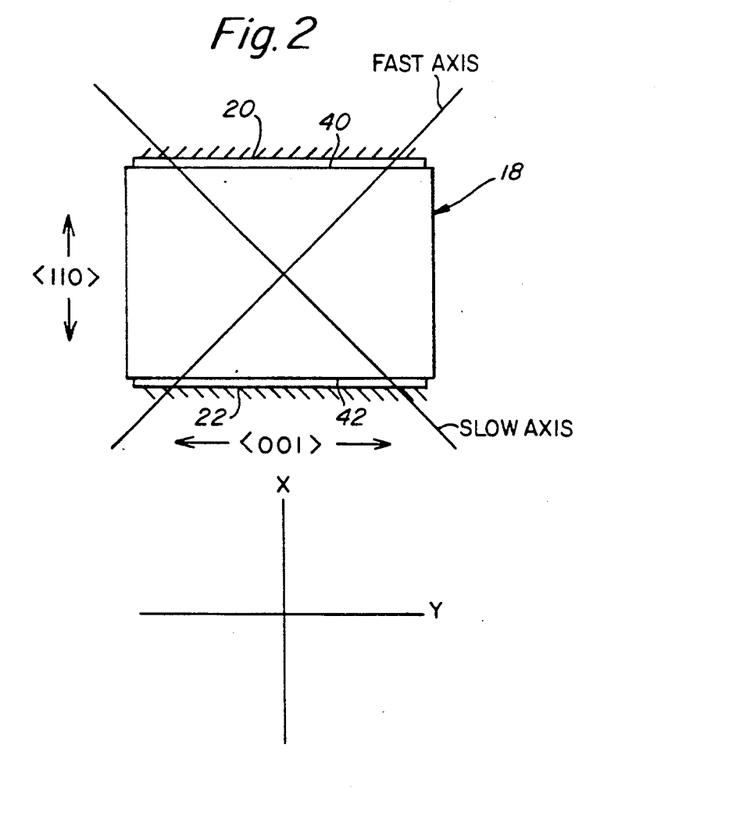
FIG. 2 diagrammatically shows the orientation of the fast and slow axes in the electro-optic crystal used in the switch of FIG. 1

Reference is now made to FIG. 2, which figure shows the orientation of the fast and slow optical axes for an electric field extending through the crystal in the <110> direction. Crystal 18 has no natural birefringence orthogonal to the direction of light propagation (the <1$\bar{1}$0> direction) and has at least one set of well defined fast and slow optical axes. Electrodes 20 and 22 are attached to surfaces 40 and 42 of crystal 18 in the Y Z plane. The electrodes may be films of any electrically conductive substance, such as gold, silver, or copper which may be plated to surfaces 40 and 42 of crystal 18. Crystal 18 is preferably a parallelepiped crystal.

With an applied electric field, the fast crystal optical axis of crystal 18 is oriented at 45° with respect to the <110> crystal direction. The slow crystal optical axis is oriented 90° with respect to the fast crystal optical axis. In the absence of an electric field, a beam of light polarized so that it oriented along the X axis will pas through crystal 18 unaffected. When a voltage is applied to electrodes 20 and 22, an electric field will be developed across crystal 18. This electric field induces birefringence in crystal 18 which changes the plane of polarization of the light beam. By employing an electric field of suitable strength, the plane of polarization of a light beam passing through crystal 18 can be switched so that it is oriented along the Y axis.

The electric field induced birefringence of electro-optic crystal 18 as a function of the applied electric field is given by $$\Gamma(E) = \frac{2\pi n_0^3 r_{41} L E}{\lambda} \quad (1)$$

where:
$\lambda$ = the wavelength of the optical source
$n_0$ = crystal index of refraction = 2.07
$r_{41}$ = electro-optic coefficient = $1.03 \times 10^{-12}$ m/v
L = crystal length (parallel to <110>)
E = the applied electric field strength for electric fields along the <110> direction.

For an electro-optic crystal with electrodes attached to its surfaces, the applied electric field is given by $$E = V/d \quad (2)$$

where
V = the applied voltage to the electrodes
d = the crystal thickness in the <110> direction Substitution of equation (2) into equation (1) allows the electric field induced birefringence to be expressed in terms of a voltage applied to electrodes directly attached to the electro-optic crystal. A half-wave voltage may then be calculated. The half-wave voltage is defined as the voltage required to induce a birefringence value of $\pi$.

Using equations (1) and (2), the operation of the optical switch is described. Prior to the application of a voltage or electric field to crystal 18, light will travel from optical fiber 12 to optical fiber 28 since $\Gamma(E)=0$. When a voltage equal to the half-wave voltage is applied to crystal 18, $\Gamma(E)=\pi$ and therefore all of the light will be transferred from optical fiber 12 to optical fiber 36. A single pole-double throw switch is thus created. The half wave voltage is the switch activation voltage as the crystal redirects the flow of light from optical fiber 28 to optical fiber 36. The switch operation is fully bidirectional.

Equations (1) and (2) also show that the induced birefringence and, consequently, the applied voltage required to switch the plane of polarization 90 degrees is dependent on the geometry and type of the electro-optic crystal 18.

Figure 3:
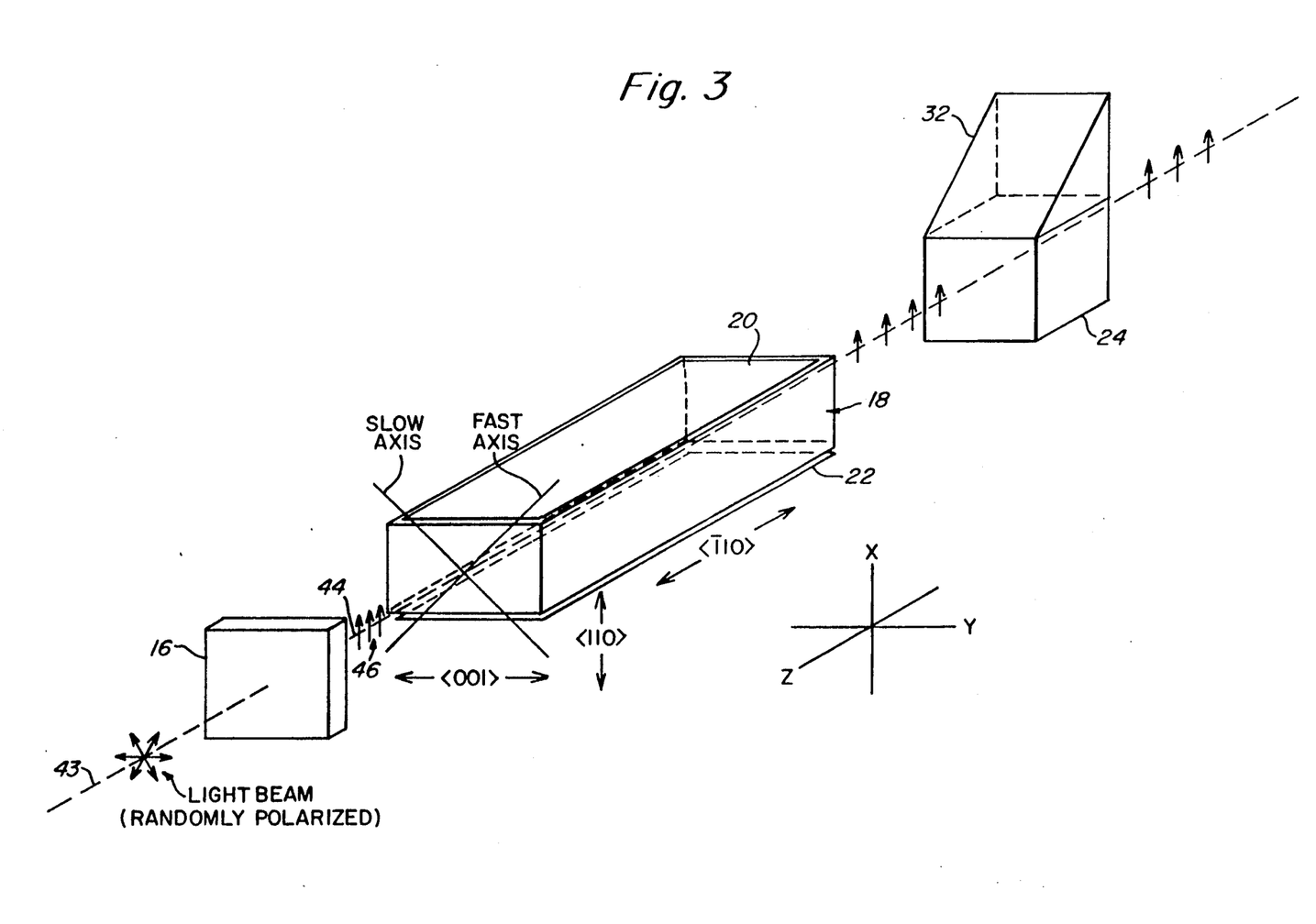
FIG. 3 is a perspective view illustrating how the optical switch of FIG. 1 operates when no electric field is applied to the electro-optic crystal.
Figure 4:
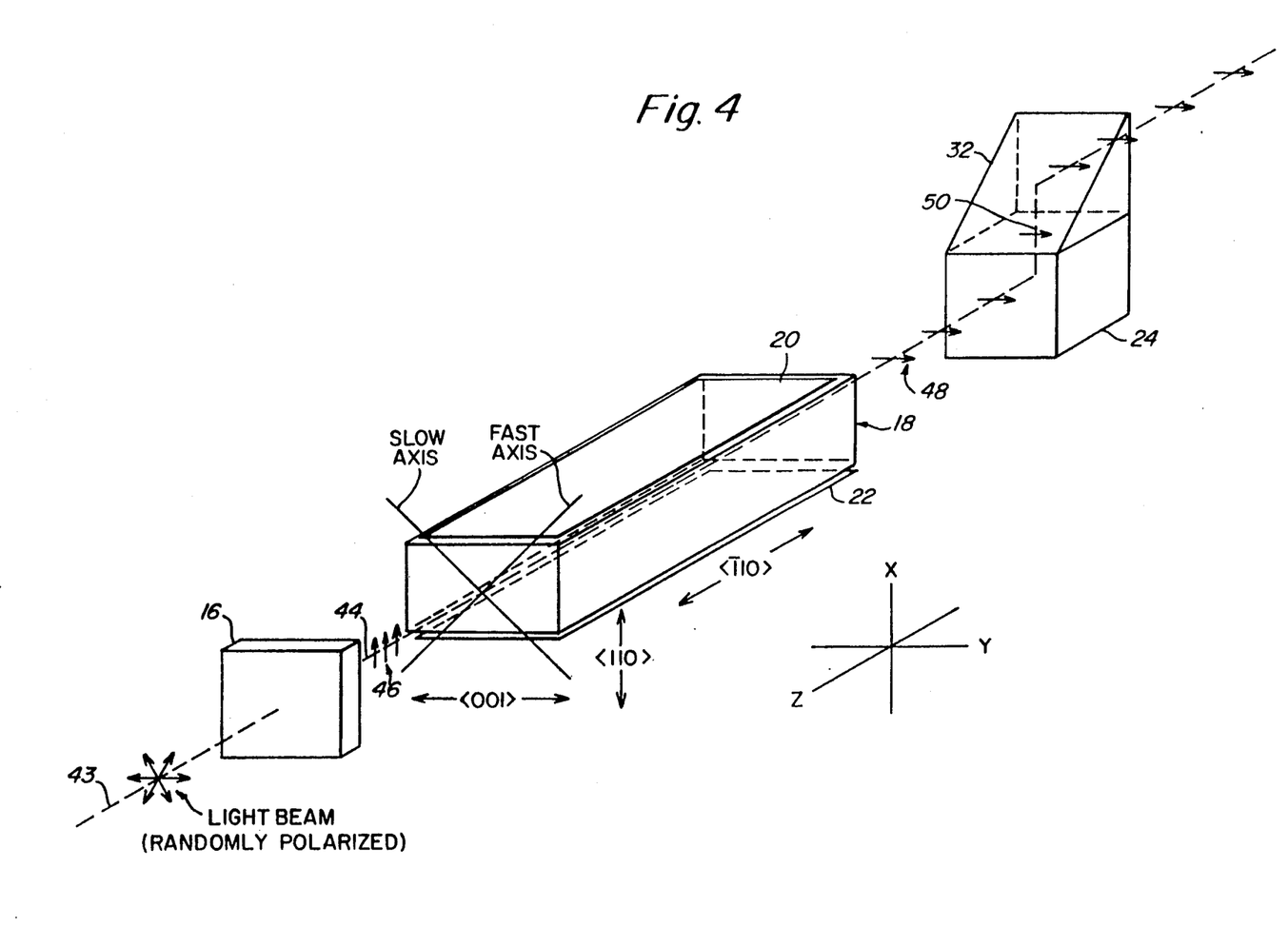
FIG. 4 is a perspective view illustrating how the optical switch of FIG. 1 operates when an electric field having a sufficient magnitude to effect switching is applied to the electro-optic crystal.

Reference is now made to FIGS. 3 and 4 to illustrate how the foregoing principles are used in the optical switch of the invention. In FIGS. 3 and 4 there is shown a perspective view of the optical switch of FIG. 1 including polarizer 16, electro-optic crystal 18 with electrodes 20 and 22, and beam splitting polarizer 24 along with prism 32. Crystal 18 is oriented as described in FIG. 2 and further so that the length of the crystal along the <110> direction is parallel to the direction of travel of the light beam. In the switches illustrated in FIGS. 3 and 4, the <001> crystal direction is parallel to the Y axis, the <110> crystal direction is parallel to the X axis, and the <1̄10> crystal direction is parallel to the Z axis.

Polarizer 16 is a vertical polarizer and acts to polarize the input light beam 43 so that the light beam 44 emerging from polarizer 16 is vertically polarized (oriented along the X axis) as indicated by arrows 46. This direction is parallel to the <110> direction of crystal 18.

In FIG. 3, no electric field is applied to crystal 18. Therefore, vertically polarized light beam 44 passe through crystal 18 and into beam splitting polarizer 24. Beam splitting polarizer 24 is oriented so that vertically polarized light passes straight through. Thus, vertically polarized light beam 44 will pass through crystal 18 and beam splitting polarizer 24 unaffected.

Referring now to FIG. 4, the same components are illustrated. In FIG. 4, an electric field has been applied via electrodes 20 and 22 to crystal 18 along the <110> crystal direction. The electric field applied is of sufficient magnitude for the length of crystal 18 to switch the plane of polarization of light beam 44 from a direction oriented along the X axis to a direction oriented along the Y axis. That is, the voltage applied to electrodes 20 and 22 is equal to the half-wave voltage. The half-wave voltage therefore creates an electric field of sufficient magnitude between electrodes 20 and 22 to induce a birefringence value of $\pi$ which switches the plane of polarization of light beam 44 from a state oriented along the X axis to a state oriented along the Y axis. Therefore, light beam 44 emerging from crystal 18 is horizontally polarized (oriented along the Y axis) as indicated by arrows 48. When the now horizontally polarized light beam enters beam splitting polarizer 24, it is directed to prism 32 as shown by dashed line 50. Prism 32 serves to reflect light beam 50 into a separate optical detector 38. One skilled in the art will appreciate that prism 32 is not a requirement of the invention, but is included in a preferred embodiment to reduce the physical size of the optical switch. If prism 32 is not used, collimating means 34 would be disposed adjacent beam splitting polarizer 24 to receive the horizontally polarized light beam 50.

One skilled in the art will appreciate that several modifications may be made to the switch illustrated in FIGS. 1-4 in order to improve its operation. First, although the invention has been illustrated with an electric field oriented along the <110> direction and the crystal length extending in the <1̄10> direction, the crystal may be oriented along any other appropriate axes, such as having the electric field extend along the <001> direction when the crystal length extends along the <110> direction.

Another modification which may be made is to increase the length of crystal 18 to decrease the activation voltage required, i.e., the half wave voltage necessary across electrodes 20 and 22 to induce enough birefringence to switch the plane of polarization from one orientation to another. As shown by equations (1) and (2), the amount of electric field induced birefringence is directly proportional to the strength of the applied electric field and the length of the crystal. Increasing the electric field strength or increasing the length of the crystal used will increase the total amount of electric field induced birefringence. For a given electric field strength, the amount of electric field induced birefringence can be increased by increasing the crystal length, as shown in equation (1). The length of crystal 18 may be increased by using a longer single crystal or by using several crystals in series. The required activation voltage can also be decreased by providing means for reflecting the beam internally several times through the crystal in order to increase the effective optical path length which has the same effect as increasing the length of the crystal.

The intensity I of the light passing through beam splitting polarizer 24 of the optical switch is a function of the intensity of the light incident on the crystal 18 and the amount of birefringence $\Gamma(E)$ induced in the crystal by the electric field between electrodes 20 and 22. Expressed mathematically, the intensity I of the light beam transmitted through the optical switch as illustrated in FIG. 3 is given by:

$$I = \frac{I_0}{2} \cos^2 \frac{\Gamma(E)}{2} \quad (3)$$

where $I_0$ is the intensity of the light incident on polarizer 16.

The intensity I of the light beam transmitted through the optical switch as illustrated in FIG. 4 is given by:

$$I = \frac{I_0}{2} \text{SIN}^2 \frac{\Gamma(E)}{2} \qquad (4)$$

Thus, it will be seen that with random polarization entering polarizer 16, there will be an immediate loss of light intensity of 3 dB. That is, one half of the input light intensity $I_0$ is lost when passing through polarizer 16.

Figure 5:
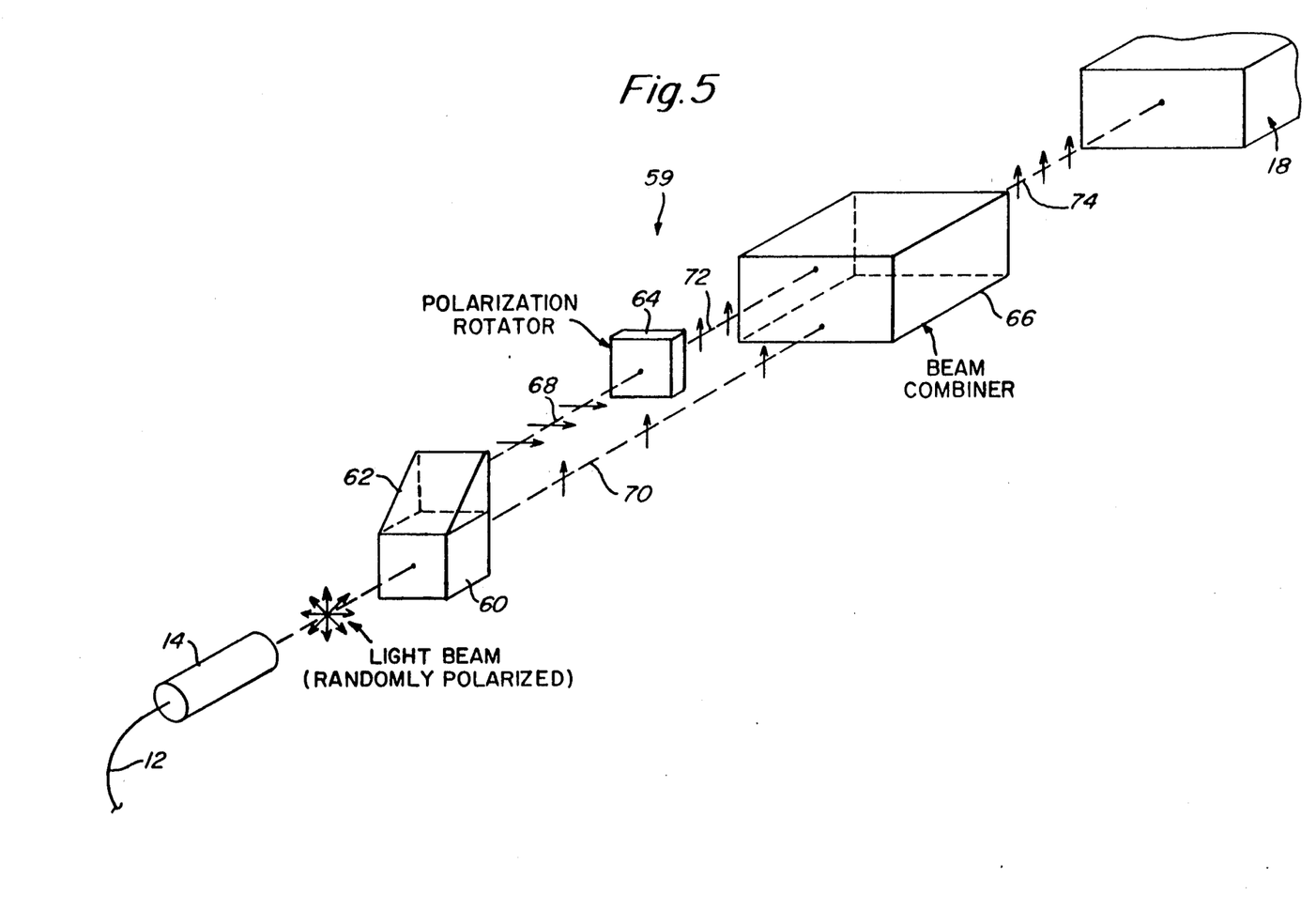
FIG. 5 is a perspective view illustrating polarization control optics which may be used to enhance the performance of the optical switch of FIG. 1.

To prevent the loss of light intensity through polarizer 16 and to reduce the insertion loss of the optical switch, another embodiment of the present invention substitutes the polarization control optics illustrated in FIG. 5 for polarizer 16.

Referring to FIG. 5 in more detail, the polarization control optics 59 includes a light directing means 60 which may be, for example, a beam splitting polarizer similar to light directing means 24, and a prism 62. Polarization control optics 59 also includes a polarization rotator 64 which may be a half-wave plate, for example, and a light beam combiner 66. Unpolarized light emerging from collimating means 14 impinges on beam splitting polarizer 60. Beam splitting polarizer 60 operates in the same manner as beam splitting polarizer 24. In the illustrated embodiment, a portion of the input light intensity having a plane of polarization oriented along the X axis passes through beam splitting polarizer 60 and emerges as light beam 70. The portion of the input light beam having a plane of polarization oriented along the X axis is generally 50% of the input light intensity. The remaining 50% of the input light intensity has a plane of polarization oriented along the Y axis. The portion of the input light beam having a polarization along the Y axis enters beam splitting polarizer 60 and is directed into prism 62. Light beam 68 emerging from prism 62 therefore has a plane of polarization oriented along the Y axis. Therefore, since 50% of the input light intensity incident is present in light beam 68 and 50% of the input light intensity is present in light beam 70, 100% of the input light intensity (neglecting losses through the components themselves) is then present in light beams 70 and 68 which emerge from beam splitting polarizer 60 and prism 62, respectively. One skilled in the art will appreciate that prism 62 is no required, but is included in a preferred embodiment to reduce the size of the optical switch. If prism 62 is not used, polarization rotator 64 would be disposed adjacent beam splitting polarizer 60 to receive the horizontally polarized light beam 68.

The planes of polarization of light beams 68 and 70 are different by 90 degrees. Light beam 68 is transmitted through polarization rotator 64 which rotates the plane of polarization of light beam 68 by 90 degrees so that the light beam 72 emerging from polarization rotator 64 is along the same direction as the plane of polarization of light beam 70.

Phase coherent light beams 70 and 72 ar transmitted to light beam combiner 66. Light beam combiner 66 merge light beams 70 and 72 together so that the emergent light beam 74 is a single light beam having a single polarization and containing substantially 100% of the input light intensity. In a preferred embodiment, light beam 74 is a vertically polarized light beam that is oriented along the X axis. However one skilled in the art will appreciate that polarization control optics 59 may be arranged so that the plane of polarization of light beam 74 can have any desired orientation.

Figure 6:
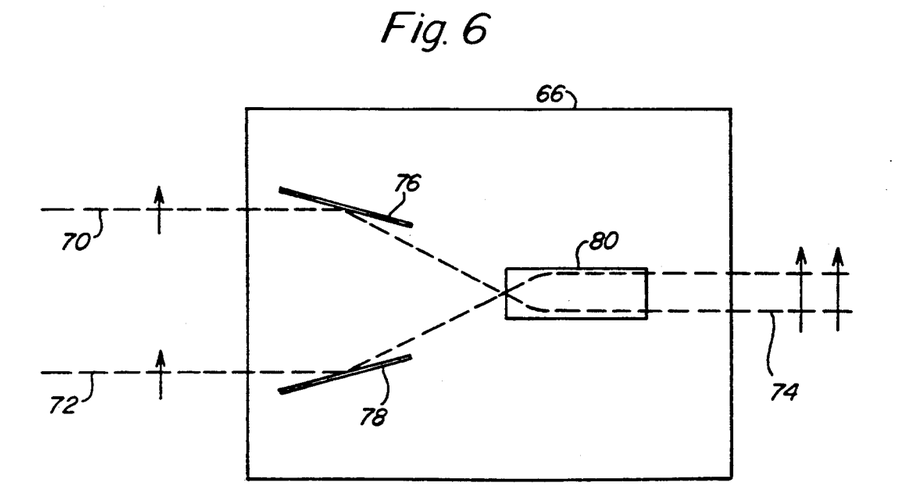
FIG. 6 illustrates a beam combiner that may be used in the polarization control optics of FIG. 5.

Reference is now made to FIG. 6, which figure depicts one illustrative embodiment of light beam combiner 66. The embodiment of FIG. 6 includes mirrors 76 and 78, along with collimating means 80. Collimating means 80 may be one of several types, such as a one quarter pitch grin-rod (graded index) lens available under the tradename SELFOC® or a refractive lens. Mirrors 76 and 78 are disposed to reflect light beams 70 and 72, respectively, to the grin-rod lens 80 with the required angle of incidence. Grin rod lens 80 combines light beams 70 and 72 to form light beam 74.

The polarization control optics 59 illustrated in FIGS. 5 and 6 allow the optical switch of the present invention to have higher overall light transmission, thereby decreasing the switch s insertion loss. The inherent 3 dB loss of input light intensity through polarizer 16 as illustrated in the embodiment of FIG. 1 can be reduced to 0.2 dB or less when the polarization control optics 59 of FIG. 5 are substituted for polarizer 16.

Although polarization control optics 59 has been illustrated as used in an optical switch, its use is not so limited. Polarization control optics 59 may be used in conjunction with optical sensors and modulators to achieve higher light transmission and decreased insertion loss in these devices as well.

Having thus described one particular embodiment of the invention, various alterations, modifications, and improvements will readily occur to those skilled in the art. For example, the single pole-double throw switch illustrated in FIG. 1 can be converted to a single pole single throw switch, i.e., an on/off switch by removing prism 32, collimating means 34, optical fiber 36, and optical detector 38. During operation, light having the appropriate plane of polarization would simply pass through beam splitting polarizer 24, while light having an orthogonal plane of polarization would be reflected away and ignored. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. An electrically controlled optical switch comprising:
    an electro-optic crystal means for receiving a light beam having at least one light path through the crystal means and a set of fast and slow optical axes for each respective light path and exhibiting electric field induced birefringence such that a light beam passing through the crystal means along a light path and having a plane of polarization oriented along a first direction may be switched to a plane of polarization oriented along a second direction; and
    first light beam directing means disposed at the other end of the crystal means for transmitting a light beam passing through the crystal means along the light path and having a plane of polarization oriented along the first direction differently from a light beam passing through the crystal means along the light path and having a plane of polarization oriented along the second direction.

2. The optical switch of claim 1 wherein the first light beam directing means comprises a beam splitting polarizer means.

3. The optical switch of claim 2 further comprising polarizer means having a plane of polarization disposed at one end of the crystal means for transmitting a light beam into the crystal means along the light path through the crystal means, the polarizer means being further disposed so that the plane of polarization is oriented along one of the first and second directions.

4. The optical switch of claim 1 wherein the crystal is a member of the crystal class $\bar{4}3m$.

5. The optical switch of claim 1 wherein the crystal is a member of the crystal class $\bar{4}2m$.

6. The optical switch of claim 1 wherein the crystal is a member of the crystal class 23.

7. The optical switch of claim 1 wherein the crystal is a bismuth germanium oxide crystal.

8. The optical switch of claim 1 wherein the crystal is a bismuth silicon oxide crystal.

9. The optical switch of claim 2 further comprising light transmission means for coupling light to the polarizer means.

10. The optical switch of claim 2 further comprising light transmission means for coupling light to the beam splitting polarizer means.

11. The optical switch of claim 9 wherein the light transmission means comprises optical fiber means.

12. The optical switch of claim 9 further comprising collimating means for mechanically and optically coupling the light transmission means to the polarizer means.

13. The optical switch of claim 10 further comprising collimating means for mechanically and optically coupling the light transmission means to the beam splitting polarizer means.

14. The optical switch of claim 1 further comprising means for establishing an electric field and wherein the crystal means is within the influence of the established electric field.

15. The optical switch of claim 1 wherein the polarizer means further comprises polarization control optics means disposed at the one end of the crystal, said polarization control optics comprising means for directing substantially all of an intensity of light incident on the polarization control optics to the electro-optic crystal.

16. The optical switch of claim 15 wherein the polarization control optics means includes second light beam directing means for directing light having a plane of polarization oriented along the first direction differently from light having a plane of polarization oriented along the second direction.

17. The optical switch of claim 16 further comprising polarization rotator means for altering the plane of polarization of the light polarized along the second direction to conform to the polarization of the light polarized along the first direction.

18. The optical switch of claim 17 wherein the polarization control optics means includes a light beam combiner means for combining the light transmitted by the polarization rotator means with light transmitted by the second means for directing light and having a plane of polarization oriented along the first direction.

19. The optical switch of claim 1 wherein the first and second directions are orthogonally disposed.

20. The optical switch of claim 16 wherein the second means for directing light comprises a beam splitting polarizer means.

21. The optical switch of claim 1 wherein the crystal means comprises a signal set of fast and slow optical axes along a single light path through the crystal means.

22. The optical switch of claim 10 wherein the light transmission means comprises optical fiber means.

23. Apparatus for converting light having random polarization to light having a single plane of polarization, comprising:
means for converting light having random polarization to light including a plurality of light beams each having a respective plane of polarization;
means for converting the respective planes of polarization to a single plane of polarization; and
means for combining the plurality of light beams having a single plane of polarization into a single light beam.

24. The apparatus of claim 23 wherein the means for converting light having random polarization to light including a plurality of light beams each having a respective plane of polarization comprises a beam splitting polarizer means.

25. The apparatus of claim 24 wherein the beam splitting polarizer means comprises a Glan-Taylor prism.

26. The apparatus of claim 25 further comprising a prism disposed adjacent to the Glan-Taylor prism.

27. The apparatus of claim 24 the means for converting the respective planes of polarization to a single plane of polarization comprises at least one polarization rotator.

28. The apparatus of claim 27 wherein the polarization rotator comprises a half-wave plate.

29. The apparatus of claim 27 wherein the means for combining the plurality of light beams comprises a collimating means and at least one mirror means for directing the light beams into the collimating means.

30. The apparatus of claim 29 wherein the collimating means comprises a grin-rod lens.

31. The apparatus of claim 29 wherein the collimating means comprises a refractive lens.

* * * * *